Feb. 10, 1942. P. B. STREANDER 2,272,441
COMBINED DEGREASING AND GRIT REMOVAL
Filed July 25, 1938 3 Sheets-Sheet 1

INVENTOR
PHILIP B. STREANDER
BY Louis L. Ansart
his ATTORNEY

Feb. 10, 1942.    P. B. STREANDER    2,272,441
COMBINED DEGREASING AND GRIT REMOVAL
Filed July 25, 1938    3 Sheets-Sheet 2

INVENTOR
PHILIP B. STREANDER
BY
ATTORNEY

Feb. 10, 1942.  P. B. STREANDER  2,272,441
COMBINED DEGREASING AND GRIT REMOVAL
Filed July 25, 1938  3 Sheets-Sheet 3

INVENTOR
PHILIP B. STREANDER
BY
ATTORNEY

Patented Feb. 10, 1942

2,272,441

UNITED STATES PATENT OFFICE 2,272,441

COMBINED DEGREASING AND GRIT REMOVAL

Philip B. Streander, Maplewood, N. J., assignor to Underpinning & Foundation Co., Inc., New York, N. Y., a corporation of New York Application July 25, 1938, Serial No. 221,142

5 Claims. (Cl. 210—3)

This invention relates to the treatment of sewage and the like and more particularly to the removal of grease or other soluble matter and grit from the liquid bearing the same.

The main object of the invention is to provide for the economical removal of both grease and so-called grit in a novel and advantageous manner. Another object is to provide for the separation from the grit of substantially all organic matter adhering thereto in the sewage and then removing from the sewage the grit thus cleaned. Another object of the invention is to provide novel and advantageous apparatus for degreasing sewage and the like and at the same time removing grit and the like.

According to a preferred manner of carrying out the invention, use is made of a tank of which the bottom is made of portions inclined downwardly from the sides of the tank to the sides of a channel into which the grit passes along the inclined portions of the bottom. Above the grit channel there may be provided an air supply device extending substantially the full length of the chamber above the channel so that the grit may pass beneath the air supply device into the grit channel. The air supply device may comprise a plurality of chambers separated by transverse dividing walls into compartments having air diffusers such as porous plates at their tops. The tank may be provided with transverse partitions resting on the tops of said dividing wall and dividing the tank into a plurality of compartments within each of which are baffles extending longitudinally of the tank and arranged with their lower ends spaced apart above the air diffusers and inclined outwardly towards the top of the tank but terminating beneath the tops of the transverse partitions and below the level at which liquid is to be maintained in the tank. In the grit channel beneath the air supply device there is provided an endless conveyor to carry the grit to a sump at the effluent end of the tank, the grit accumulated in the sump being removed by suitable means such as a grit elevator by which the accumulated material is discharged from the apparatus. The grit elevator is enclosed in a housing or chamber separated from the tank except at the point where the grit is discharged into the sump. Clean water may be added to the compartment housing the grit elevator so as to give a slightly downward flow to the liquid therein. The action of the scrapers or plows of the conveyor tends to constantly turn over the accumulated grit and thereby scour the same.

The sewage may be supplied to the tank beneath the surface of the liquid therein and preferably through an influent well connected to the interior of the tank at one end thereof by an opening which is central with reference to the tank. The sewage entering the first compartment of the tank through this central opening flows upwardly between the longitudinal baffles or deflectors above the air diffusers and flows out over the top thereof and downwardly toward the sloping sides of the bottom of the tank. Part of the liquid in this compartment may flow directly therefrom through two openings in the first partition and outside of the deflectors into the second compartment while other portions of the liquid may pass around the deflectors one or more times before passing through these openings. This circulation tends to scrape the organic matter from the grit particles which drop on inclined portions of the bottom and are carried beneath the air supply device into the grit collecting channel. The circulation in the second compartment is similar to that of the first except as to the admission of the influent liquid and the discharge of the same through a central opening in the second transverse partition. After passing through several compartments set off by partitions provided alternately with single central openings and two outer openings, the liquid passes into a final compartment where it is passed beneath a transverse baffle and then upwardly over weirs at opposite sides of the grit elevator housing into branch channels which join at the effluent side of the grit elevator and discharge into a common effluent duct.

The air supplied through the air diffuser devices or plates at the bottom of the tank becomes entrained in the grease and other soluble matter and forms a froth or scum which floats to the surface of the liquid or sewage in the tank. This froth or scum may be removed from any compartment at suitable times by drawing off the upper surface of the liquid.

Other objects, features and advantages will appear upon consideration of the following description and of the drawings in which.

Figure 1:
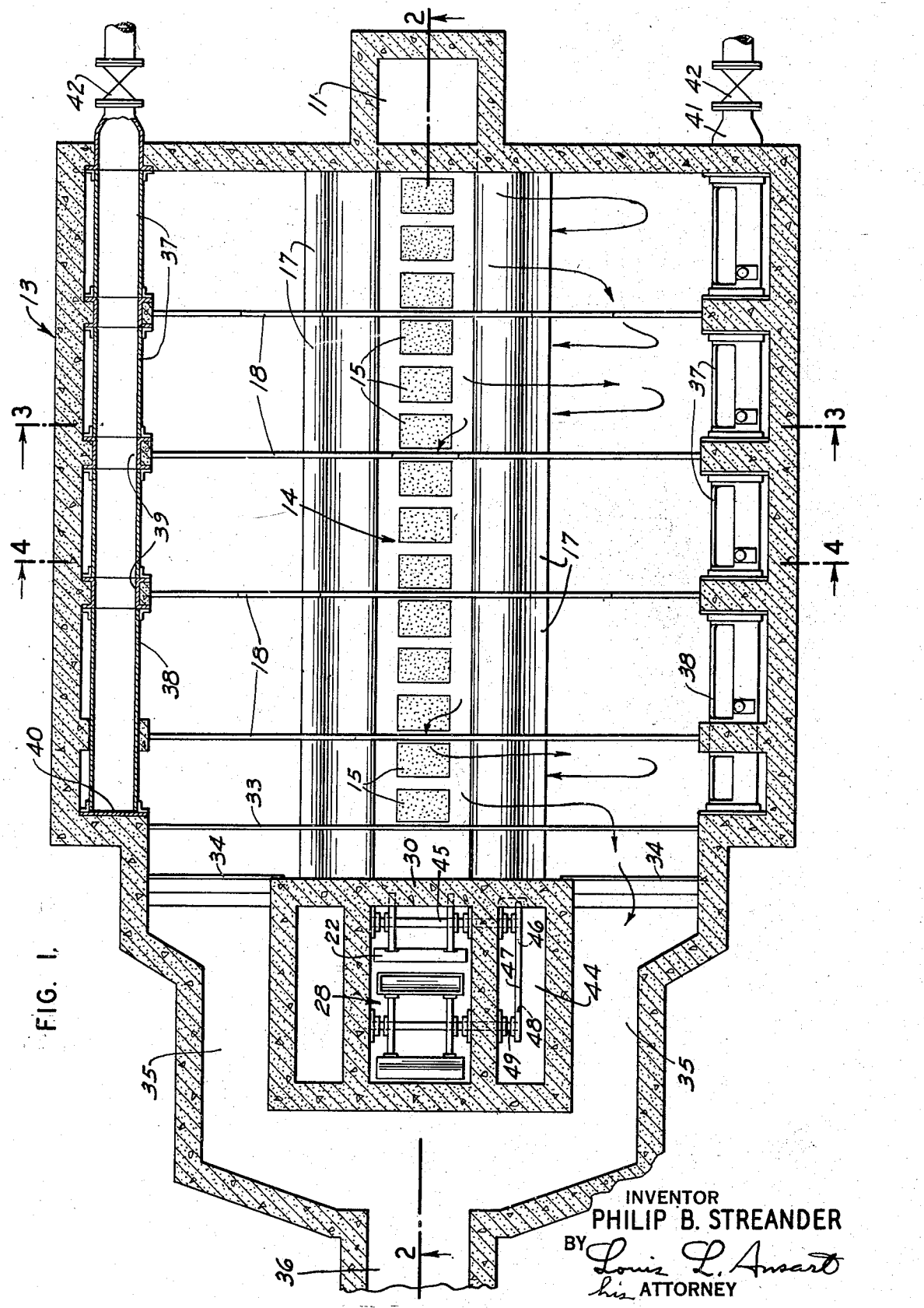
Fig. 1 is a horizontal section of the apparatus taken in a plane at substantially the level at which liquid is to be maintained in the apparatus.
Figure 2:
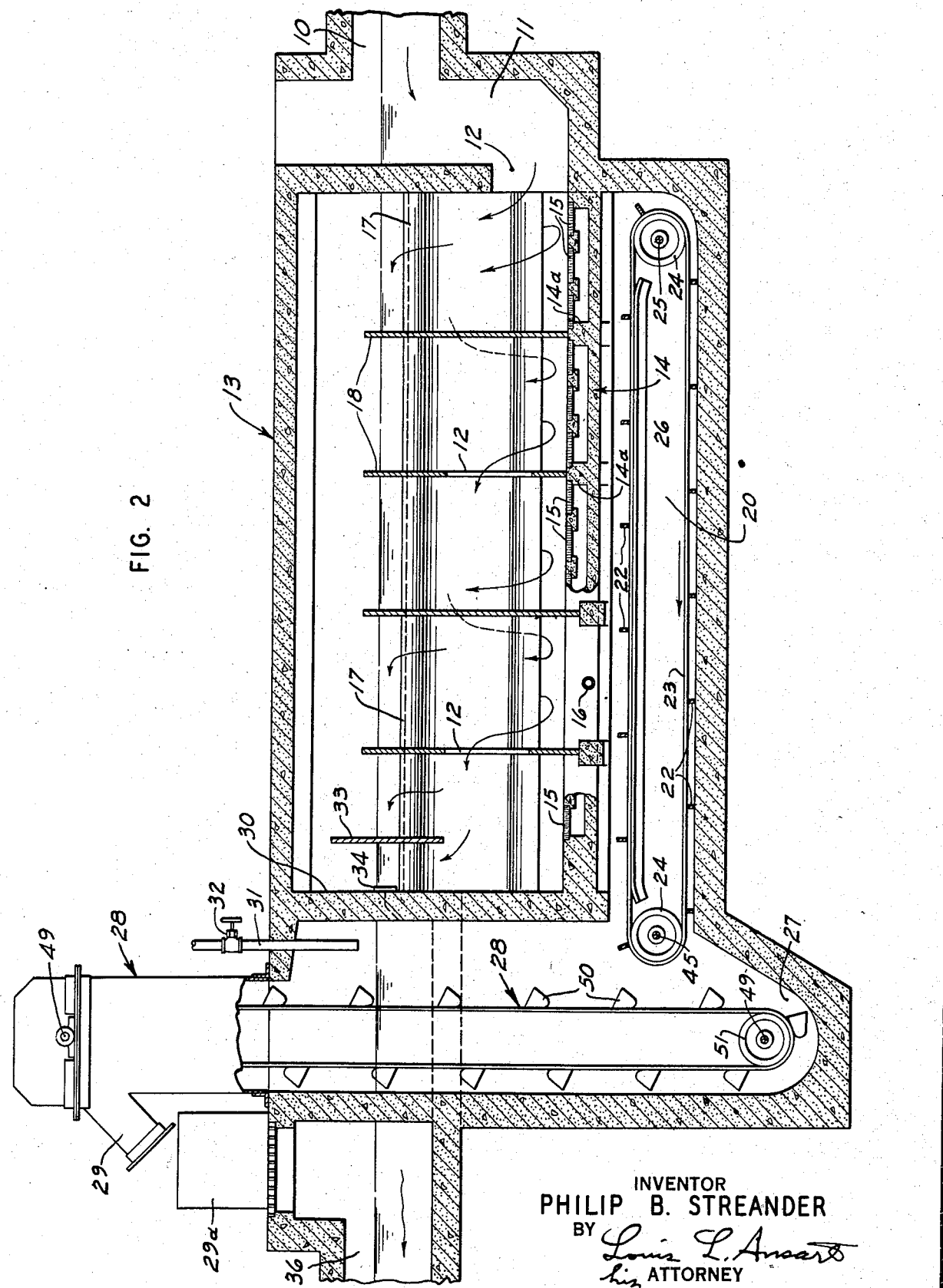
Fig. 2 is a vertical section taken along the line 2—2 of Fig. 1.
Figure 4:
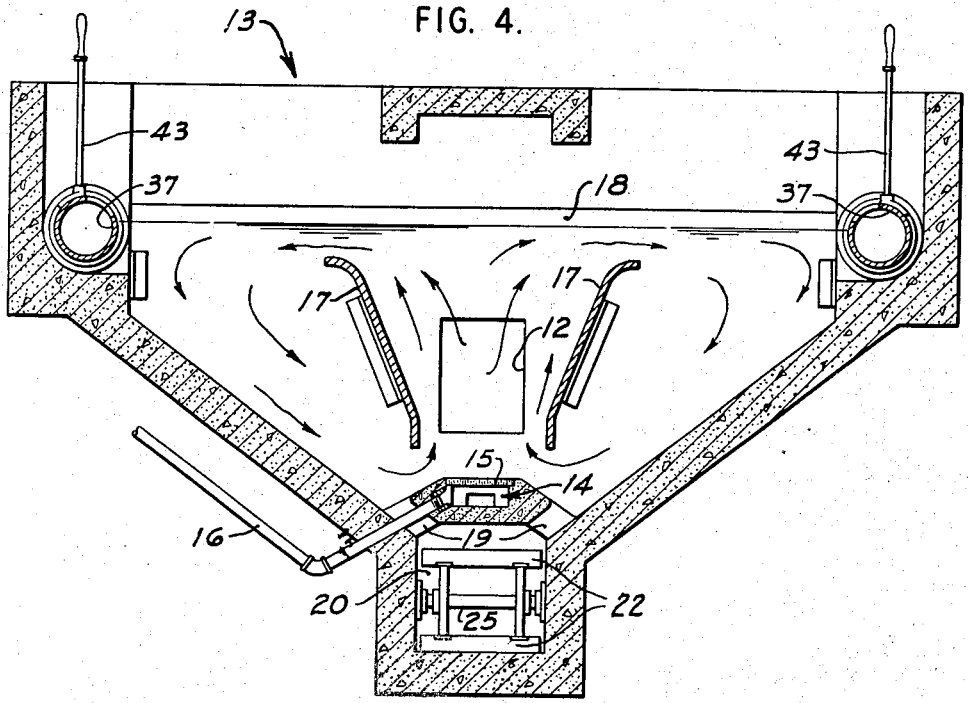
Fig. 4 is a section taken along the line 4—4 of Fig. 1.
Figure 3:
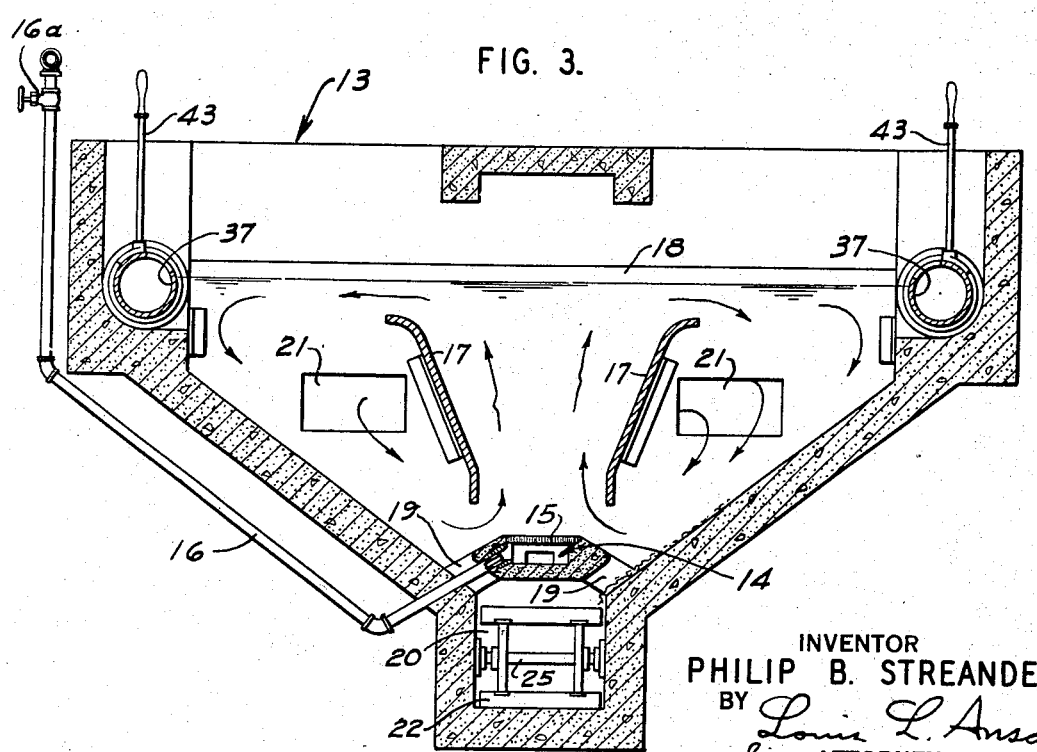
Fig. 3 is a section taken along the line 3—3 of Fig. 1.

Referring to the drawings the liquid such as sewage, is supplied through an influent duct 10 to an influent well 11 and passes from the lower part of the well 11 through an opening 12 into the central part of one end of a tank 13. Extending longitudinally of the tank is an air supply device 14 comprising compartments separated by walls 14a and provided at their tops with air diffuser devices 15 preferably in the form of plates so that air supplied to the compartments, as by means of individual supply pipes 16, may pass in the form of fine bubbles into the liquid and cause an upward movement thereof between outwardly inclined baffles or deflectors 17 connecting transverse partitions 18 resting on walls 14a and dividing the tank into a plurality of compartments. In each of these compartments the liquid is caused by the air lift action to flow upwardly between the deflectors 17 and downwardly at the outside of said deflectors. The heavy grit such as sand, will collect on inclined portions of the bottom of the tank and be moved downwardly along the same and beneath the air diffuser device 14 through slots or openings 19 into a grit channel 20. At the same time a portion of the air bubbles will become entrained in the grease and ether soluble matter and form a froth or scum which will float to the surface of the sewage.

As already described, sewage enters the first compartment through a central opening 12. In passing out of the first compartment, the sewage is passed through two openings or outlets 21 in the first partition 18, these outlets being outside of the deflectors 17. In a corresponding manner alternate partitions after the first will be provided with a single central opening or with two side openings. In passing through each compartment the liquid may flow only once over the top of the deflectors 17 and then pass through the next partition or may flow a plurality of times over the top of the deflectors. During the passage of the sewage through the various compartments, the circulation produced by the air diffusers scours the organic matter from the grit particles which drop downwardly to the bottom and pass into the grit channel which serves as a storage compartment.

The grit collecting in the grit channel may be moved from the influent end of the tank towards the effluent end of the tank by a combined grit scraper and washer comprising scrapers 22 carried by one or more endless members 23 passing around suitable devices such as pulleys 24 mounted on shafts 25. The upper reach of the conveyor constituting the combined grit scraper and washer may be kept from sagging by means of one or more supports 26. The lower reach of the grit scraper moves in a direction indicated by an arrow so that the scrapers 22 will move material collected on the bottom of the channel toward the effluent end of the apparatus and discharge it into a sump 27 from which the accumulated grit may be removed by suitable means such as a grit elevator 28 and dumped through a discharge pipe 29 into a suitable receptacle or conveying means. The grit elevator is shut off from the tank by a housing 30 except at the point where the grit is introduced by the grit scraper device. Fresh water may be supplied to the interior of the housing 30 through a pipe 31 controlled by a valve 32, so that there will tend to be a downwardly flow of liquid in the housing 30.

In the last compartment or that which is located at the effluent side of the last partition 18, there is a transverse baffle 33 located near the surface of the liquid and extending above the same to hold back scum and froth collecting thereon. From the last compartment the liquid passes beneath this baffle 33 and then is discharged over weirs 34 at opposite sides of the housing 30 into branch ducts 35 which come together at the effluent side of the housing 30 and discharge into an effluent duct 36.

The scum may be withdrawn from the surface of the liquid in the various compartments by any suitable means. As illustrated this is done by means of rotatable slotted tubes 37 arranged at both sides of the tank in the first three compartments and rotatable slotted tubes 38 extending along the fourth compartment and the space between the fourth transverse partition and the transverse baffle 33. These rotatable slotted tubes may, except at the influent end of the tank, be rotatably supported by stationary tubular portions 39 located at the ends of the partitions, and a stationary closing member 40 at the effluent end of the rotatable tube 38. The rotatable tubes 37 at opposite sides of the first compartment are rotatably connected with ducts 41 carried by the wall at the influent end of the tank and controlled by valves 42. The grease and scum may be discharged through the pipes 41 to any desired point. The rotatable slotted tubes combine the functions of discharge ducts and adjustable weirs. Each of the rotatable slotted tubes may be controlled by an arm 43 attached thereto.

The grit conveyor and the grit elevator may be operated in any suitable manner (not shown) and one of them may be operated by the other through suitable connections, for example, as indicated in Fig. 1, the shaft 25 at the discharge end of the grit conveyor may extend into a dry well 44 in the housing 28 at one side of the grit elevator and may be connected to a shaft 45 at the lower end of the elevator by means of a pulley 46 on the shaft 25 and one or more endless connectors 47 passing around the pulley 46 and a pulley 48 on a shaft 49 at the lower end of the grit elevator 28 which may comprise one or more endless members 49 carrying buckets 50 and passing around wheels 51 on the lower shaft 49 and corresponding wheels (not shown) on a shaft 49 at the upper end of the grit elevator. If desired both the grit conveyor and the grit elevator might be driven through the shaft 49 at the upper end of the grit elevator.

In operation the sewage or other liquid to be treated is supplied through the influent duct or pipe 10 to the vertical chamber or well 11 from the lower part of which it flows through the opening 12 to the interior of the tank 13. As soon as the liquid enters the compartment set off by the first partition 18, it is caused to flow upwardly through the air lift tube formed between the deflectors 17 in this compartment by means of bubbles of air from the air diffusers 15 at the lower part of the compartment. The liquid lifted by the air in this manner passes over the tops of the deflectors and downwardly at the outer sides thereof and may pass either once only or repeatedly around the deflectors. Eventually, however, the liquid passes out of the first compartment through openings 21 in the first partition 18 into the second compartment formed between the first and second deflectors.

The circulation of the liquid in the first compartment serves to scrub organic matter from the grit particles which have a higher specific gravity than the sewage and the heavier grit particles gradually pass downwardly to and through slots 18, between the air supply device 14 and the inclined portions of the bottom of the tank, into the grit channel and storage compartment 20. It will be apparent that grit will be prevented from settling on the diffusers by the upward flow of air therefrom. During the passage of the sewage through the first compartment, air bubbles from the diffusers become entrained in the grease and ether soluble material in the sewage and form a froth or scum which floats to the surface of the liquid.

In the second compartment, the action is substantially the same as in the first compartment, except that the liquid enters through the openings 21 in the first partition outside of the deflectors 17 and eventually the liquid passes out of a central opening 12 in the second partition 18. The same general effects are produced in the third and fourth compartments between partitions 18 and to a certain extent in the compartment between the fourth partition 18 and the wall at the effluent end of the tank.

Preferably the amount of air introduced into each compartment or section from the influent end of the tank to the effluent end is gradually decreased so as to secure a decrease in the upper velocity of flow through the diffuser sections of the compartments. This may be done by suitably controlling the flow of air through the various pipes 16 by use of valve 16a. As a result of this variation in air supply the heavier particles of grit settle in the first compartment and smaller sizes of grit in the following compartments. The action of the air lift section or tube of each compartment raises the sewage vertically and at a decreasing velocity until it is discharged over the tops of the deflectors 17 towards both sides of the compartment and flows downwardly to the influent end of the air lift section, the entire mass of sewage in each compartment being kept in constant circulation.

This circulation scrubs the organic matter from the grit particles which eventually pass downwardly through the grit slots 19 into the grit channel and storage compartment 20 in which the grit is moved slowly from the influent end of the tank towards the effluent end by means of a combined grit scraper and washer. The action of the scrapers or plows 22 tends to constantly turn over the accumulated grit and thus to further scour the grit and sand. The clean grit and sand is discharged into a sump 27 from which it is lifted by the grit elevator 28 and discharged therefrom through spout or pipe 29 into a suitable device 29a resting on a grating through which liquid may drain into the effluent duct 36. Clean water is added to the interior of the housing 30 of the grit elevator through a pipe 31 so as to give a slightly downward flow to the liquid contained in this housing. One effect of this addition of water may be to compensate for liquid withdrawn from the housing by the grit elevator 28 and thereby prevent downward flow of liquid through the slots 19.

The partitions 18 rise above the level of the liquid in the tank and serve to prevent the forward movement of the scum formed in each section. After passing through the opening 12 in the fourth partition, the sewage passes beneath a transverse baffle 33 which tends to hold back any scum rising to the surface of the liquid, and flows over weirs 34 to the branch channels 35 at the sides of the housing 30, such branch channels coming together into an effluent pipe or channel 36. The scum rising to the surface in the various compartments may be withdrawn from the surface of the liquid in the various compartments into ducts or channels at the sides of the tank when desired. In the present apparatus this effect is produced by means of rotary slotted tubes 37 and 38 rotatable by means of arms 43 attached thereto. The inner edges of the slots are normally kept above the surface of the liquid but when any one of these rotatable tubes is turned to bring this edge of the slot beneath the surface of the liquid, the liquid at the surface will flow into the rotatable tube and be drawn off through one of the ducts 41. It will be seen that the portion of each rotatable tube at the inner edge of the slot surface serves as an adjustable weir. After the liquid is thus substantially freed from grease and grit, it flows away through the duct or pipe 36 and may receive further treatment as required.

The scouring of the grit in this apparatus serves to remove from the grit substantially all of the organic matter adhering thereto so that the grit removed from the tank will be substantially free of all matter which would decompose and become offensive and insanitary.

Furthermore the aeration in the tank not only assists in the scouring of the grit but the air bubbles take up material including grease and form a scum which can easily be removed from the liquid. Some of the material in the scum may be reclaimed.

It should be understood that many changes may be made in carrying out the invention and that certain features may be used without others, without departing from the true spirit and scope of the invention.

What I claim is:

1. In a degreasing and grit removing unit, the combination of a tank decreasing in width towards its greatest depth, a grit channel at the bottom of said tank, air lift means for producing upward currents at the middle of the tank and downward currents at the sides thereof and effect scrubbing of the grit before downward passage thereof into the grit channel, means for supplying sewage at the influent end of the tank, means for discharging effluent from the other end of the tank, a conveyor for moving the grit along the channel and at the same time scrubbing and washing the same, a grit elevator receiving grit from said channel, and a housing separating the grit elevator from the interior of the tank except where it receives grit from the conveyor.

2. In a degreasing and grit removing unit, the combination of a tank decreasing in width towards its greatest depth, a grit channel at the bottom of said tank, air lift means for producing upward currents at the middle of the tank and downward currents at the sides thereof and effect scrubbing of the grit before downward passage thereof into the grit channel, means for supplying sewage at the influent end of the tank, means for discharging effluent from the other end of the tank, a conveyor for moving the grit along the channel and at the same time scrubbing and washing the same, a grit elevator receiving grit from said channel, a housing separating the grit elevator from the interior of the tank except where it receives grit from the conveyor, and means for supplying water to said housing to cause a downward flow of liquid in the housing.

3. In a degreasing and grit removing unit for sewage treatment, the combination of a tank decreasing in width toward its deepest part, a grit channel at the bottom of said tank, means for removing grit from the grit channel, inlet means at the influent end of the tank, outlet means at the effluent end, transverse partitions separating the tank into compartments except for openings through which liquid may pass from one compartment to another, air diffusers at the bottoms of the various compartments but spaced from the grit channel, means for varying the supply of air to said diffusers, longitudinal baffles in each compartment above the air diffusers and providing an air lift tube up which the sewage and grit is carried and discharged laterally at the top to flow downwardly at the sides of the tank, means for removing scum from the surface of the liquid in said compartments, and a transverse baffle at the surface of the liquid in the last compartment to prevent flow of scum to the outlet means.

4. In a degreasing and grit removing unit for sewage treatment, the combination of a tank decreasing in width toward its deepest part, a grit channel at the bottom of said tank, means for removing grit from the grit channel, inlet means at the influent end of the tank, outlet means at the effluent end, transverse partitions separating the tank into compartments except for openings through which liquid may pass from one compartment to another, air-lift means including air diffusers at the bottoms of the various compartments but spaced from the grit channel, means for varying the supply of air to said diffusers, means for removing scum from the surface of the liquid in said compartments, and a transverse baffle at the surface of the liquid in the last compartment to prevent flow of scum to the outlet means.

5. In a degreasing and grit removing unit for sewage treatment, the combination of a tank decreasing in width toward its deepest part, a grit channel at the bottom of said tank, means for removing grit from the grit channel, inlet means at the influent end of the tank, outlet means at the effluent end, transverse partitions separating the tank into compartments, air diffusers at the bottoms of the various compartments but spaced from the grit channel, means for varying the supply of air to said diffusers, longitudinal baffles in each compartment above the air diffusers and providing an air lift tube up which the sewage and grit is carried and discharged laterally at the top to flow downwardly at the sides of the tank, liquid being fed into one compartment between the longitudinal baffles and discharged outside of the baffles and in an adjoining compartment being supplied outside the baffles and withdrawn from between the baffles, means for removing scum from the surface of the liquid in said compartments, and a transverse baffle at the surface of the liquid in the last compartment to prevent flow of scum to the outlet means.

PHILIP B. STREANDER.